(12) United States Patent
Cardenas Riojas

(10) Patent No.: US 9,124,197 B2
(45) Date of Patent: Sep. 1, 2015

(54) ELECTRICAL ENERGY MICROGENERATOR WITH MAGNETIC COUPLING

(76) Inventor: Alfredo Manuel Cardenas Riojas, Villahermosa Tabasco (MX)

( * ) Notice: Subject to any disclaimer, the term of this patent is extended or adjusted under 35 U.S.C. 154(b) by 10 days.

(21) Appl. No.: 13/580,570

(22) PCT Filed: Jan. 5, 2011

(86) PCT No.: PCT/MX2011/000001
§ 371 (c)(1),
(2), (4) Date: Jul. 12, 2013

(87) PCT Pub. No.: WO2011/102703
PCT Pub. Date: Aug. 25, 2011

(65) Prior Publication Data
US 2013/0277987 A1    Oct. 24, 2013

(30) Foreign Application Priority Data
Feb. 22, 2010    (MX) .................. MX/a/2010/002024

(51) Int. Cl.
| F02B 63/04 | (2006.01) |
| H02K 7/18 | (2006.01) |
| H02N 11/00 | (2006.01) |
| H02K 5/136 | (2006.01) |
| H02K 7/11 | (2006.01) |

(52) U.S. Cl.
CPC .......... *H02N 11/002* (2013.01); *H02K 7/1823* (2013.01); *H02K 5/136* (2013.01); *H02K 7/11* (2013.01)

(58) Field of Classification Search
USPC .................................. 290/1 A, 52
See application file for complete search history.

(56) References Cited

U.S. PATENT DOCUMENTS

| 2,669,668 A | * | 2/1954 | Okulitch et al. | .............. 310/104 |
| 3,299,819 A | * | 1/1967 | McCoy | .......................... 417/420 |
| 3,420,184 A | * | 1/1969 | Englesberg et al. | .......... 417/420 |

(Continued)

*Primary Examiner* — Pedro J Cuevas
(74) *Attorney, Agent, or Firm* — James P. Muraff; Neal, Gerber & Eisenberg LLP

(57) ABSTRACT

The present in relates to an electric energy Micro Generator, integrated by a pneumatic motor and an electric Generator coupled magnetically, where the pneumatic motor is propelled by the fluid pressure associated with: air, natural gas, bitter gas, nitrogen, etc. designed to be intrinsically safe, with an index of protection against intrusion of solid objects or dust, accidental contacts, or water IP 67, according to the International Electro technical Commission, for use in hazardous locations "where fire or explosion may exist due to flammable gases or vapors, flammable liquids, combustible dust or flammable fibers or in suspension". "Classified as Class I, Division 1, Group A, B, C and D, according to U.S. National Electrical Code, and which has its main field of application remote installations that lack electricity, but that dispose of a pressure associated with a fluid.
In this regard, it is important to mention that:
The pressure associated with the propellant fluid can be as low as 5 Kg/cm2 and as high as up to at least 700 kg/cm2;
The implementation of magnetic coupling ensures that there is no possibility that the fluid used as propelling means, the high pressures associated with said fluid, the pneumatic motor and none of the pieces that integrated it, have contact and/or enter the space of the electric generator and
The fluid used as propelling means is not consumed, is returned to its original process, providing a sustainable and intrinsically safe process.

9 Claims, 8 Drawing Sheets

(56) References Cited

U.S. PATENT DOCUMENTS

| | | | |
|---|---|---|---|
| 3,465,681 A * | 9/1969 | Zimmermann | 417/420 |
| 3,512,901 A * | 5/1970 | Law | 417/53 |
| 3,624,706 A * | 11/1971 | Leonard, Jr. | 62/476 |
| 3,734,651 A * | 5/1973 | Leonard, Jr. | 417/420 |
| 3,981,247 A * | 9/1976 | Theurer | 104/12 |
| 4,013,384 A * | 3/1977 | Oikawa | 417/368 |
| 4,047,847 A * | 9/1977 | Oikawa | 417/370 |
| 4,207,485 A * | 6/1980 | Silver | 310/104 |
| 4,304,532 A * | 12/1981 | McCoy | 417/420 |
| 4,520,516 A * | 6/1985 | Parsons | 4/623 |
| 4,722,661 A * | 2/1988 | Mizuno | 415/131 |
| 4,754,181 A * | 6/1988 | Mizobuchi et al. | 310/104 |
| 4,780,066 A * | 10/1988 | Bolleter et al. | 417/420 |
| 4,927,337 A * | 5/1990 | Lustwerk | 417/420 |
| 5,017,103 A * | 5/1991 | Dahl | 417/420 |
| 5,043,592 A * | 8/1991 | Hochstrasser | 290/52 |
| 5,269,664 A * | 12/1993 | Buse | 417/360 |
| 5,324,177 A * | 6/1994 | Golding et al. | 417/423.1 |
| 5,373,819 A * | 12/1994 | Linder | 123/238 |
| 5,405,251 A * | 4/1995 | Sipin | 417/420 |
| 6,011,334 A * | 1/2000 | Roland | 310/86 |
| 6,906,466 B2 * | 6/2005 | Feng | 315/55 |
| 7,005,758 B2 * | 2/2006 | Yumita et al. | 290/54 |
| 7,095,142 B2 * | 8/2006 | Leininger | 310/47 |
| 7,459,816 B2 * | 12/2008 | Yang | 310/78 |
| 7,728,464 B2 * | 6/2010 | Leininger | 310/43 |
| 7,743,683 B2 * | 6/2010 | Dayton et al. | 81/52 |
| 7,799,074 B2 * | 9/2010 | Grimme et al. | 623/3.24 |
| 8,024,995 B2 * | 9/2011 | Dayton et al. | 81/52 |
| 8,148,839 B2 * | 4/2012 | Rosefsky | 290/52 |
| 8,350,400 B2 * | 1/2013 | Rosefsky | 290/52 |
| 8,523,546 B2 * | 9/2013 | Shkolnik et al. | 418/61.2 |
| 8,546,969 B2 * | 10/2013 | Rosefsky | 290/52 |
| 2002/0041100 A1* | 4/2002 | Yumita et al. | 290/52 |
| 2005/0062428 A1* | 3/2005 | Feng | 315/76 |
| 2005/0258694 A1* | 11/2005 | Leininger | 310/156.32 |
| 2006/0032322 A1* | 2/2006 | Yang | 74/393 |
| 2007/0007771 A1* | 1/2007 | Biddle et al. | 290/7 |
| 2007/0290558 A1* | 12/2007 | Leininger | 310/71 |
| 2008/0250570 A1* | 10/2008 | Dayton et al. | 7/170 |
| 2010/0001529 A1* | 1/2010 | Rosefsky | 290/52 |
| 2010/0288520 A1* | 11/2010 | Dayton et al. | 173/1 |
| 2012/0093640 A1* | 4/2012 | Chiang et al. | 415/213.1 |
| 2012/0175881 A1* | 7/2012 | Rosefsky | 290/54 |
| 2012/0258834 A1* | 10/2012 | Winiasz et al. | 475/159 |
| 2013/0049367 A1* | 2/2013 | Adachi et al. | 290/52 |
| 2013/0084164 A1* | 4/2013 | Adachi et al. | 415/122.1 |
| 2014/0111045 A1* | 4/2014 | Goepel | 310/83 |
| 2014/0184065 A1* | 7/2014 | Deery et al. | 315/55 |

* cited by examiner

ELECTRICAL ENERGY MICROGENERATOR WITH MAGNETIC COUPLING

TECHNICAL FIELD OF THE INVENTION

The present invention relates to a Micro Generator of electric energy comprising of a pneumatic motor and an electric generator coupled magnetically, for use in hazardous locations "where fire or explosion may exist due to flammable gases or vapors, flammable liquids, flammable or combustible dusts or fibers in suspension," Classified as Class I, Division 2, Group A, B, C and D, according to U.S. National Electrical Code, which has as its main field in remote installations that lack electricity, but that have a fluid pressure associated with it.

BACKGROUND OF THE INVENTION

In various industries there is a need for alternative energy: pneumatic, electrical, mechanical, thermal, etc. but most of them have not been applied to high-risk industries.

In remote installations, considered of high risk, there is the need of electricity, which normally meets using photovoltaic systems, combustion generators, or Micro Turbines with mechanical coupling; having as possible sites of application off shore installations, devil traps, skate measurements, pipeline corridors, oil wells in remote areas, among others.

Here are some key technological problems of principal systems of electric energy generators and alternatives employed:

Photovoltaic Systems:
1. Requires large areas of instant generation,
2. Its efficiency depends on the time of solar radiation which will depend on the meridian where it is found.
3. Preventive maintenance due to direct exposure to the environment, and
4. Susceptible to theft n remote installations or unmanned areas.

Combustion Generators:
1. Non-ecological product due to fuel consumption,
2. Increased risk of explosion . . . due to the possibility of spark generation associated with the propulsion and the generation part,
3. High maintenance cost.
4. Constant supervision in refueling and checking the generator, and
5. High cost of fuel used.

Micro Turbines:
1. The propellant gas is mixed with the turbine and the electrical system, increasing the risk of corrosion and ignition to the electrical winding,
2. They do not adapt to field variations, specific flows are required for specific designed conditions,
3. Works at high revolutions above 9,000 rpm, generating more wear between moving parts, and
4. It requires a considerable gas flow to carry the turbine at such high rpm, which means more gas consumption.

Aiming to avoid and better the technological inconveniences of the alternatives of generating electric energy mentioned above, the present invention offers a Micro power electric Generator, integrated by a pneumatic motor and an electric generator magnetically coupled, where the pneumatic motor is propelled by the pressure associated to a fluid, air, natural gas, bitter gas, nitrogen, etc., designed to be intrinsically safe and that has as its main scope of application remote installations that lack electric energy, but that will dispose of pressure associated to a fluid.

In other words the Micro Generator of the present invention uses the Associated Pressure as means to a fluid propellant, where the pneumatic motor moves the electric generator through the force derived from the pressure through a magnetic coupling, replacing a mechanically coupled shaft.

The implementation of magnetic coupling in the Micro Generator of electric energy of the present invention, ensures that there is no possibility that the fluid used as propelling means, the high pressures associated to said fluid, the pneumatic motor and none of the pieces that integrate it have contact and/or penetrate into the space of the electric generator:

However, with regard to motors and electric generators, is known to be a group of devices that are used to convert mechanical energy into electrical or vice versa, with electromagnetic means. A machine that converts mechanical energy into electricity is called a generator, alternator or dynamo, and a machine that converts electrical energy into mechanical energy is called a motor.

Principles of the Electric Generator (stator & winding) are fully known the multiple accomplishments of the electric energy generators are well known as well as electric motors, all of them based in the induction principle of Faraday and Lenz Law. All these electrical engines are distinguished by an inducted circuit that generates a magnetic field that induces in another circuit an electromotive force, and the habitual practice of the induced is that both are built by a winder placed in the interior of a hollow cylindrical casing, built of ferromagnetic material called stators that are placed in grooves disposed to the effect, while the inductor circuit is disposed in a cylindrical rotor that interacts with the stator which is fed the necessary energy to generate the inductor field.

In most generators the inductor circuit consists of a winding whose coils are housed in slots or in arms that act as polar expansions with a winding in each arm, the feeder of the winding inductor is performed by means of a continuous current that generates a magnetic field, in both cases by spinning through an external mechanical force, the magnetic flow of said rotor penetrates the coils of the induced stator in a sequential form, thus generating a senoid of electromotive induced force.

In the motors the form of engine performance is the same but vice versa to the generators, the fixed field keeps being in the rotor driven with continuous current and the armature coils of the stator are divided into several parts and are fed by an exterior AC. The variation of the waves of the armature current causes a magnetic reaction with the winding poles of the fixed fields, and forces said fields to rotate at a constant speed dragging the shaft mechanically; the speed is determined by the frequency of the current in the potential line of the alternate current.

Combustion generators consist of an electric motor and a mechanically connected generator so that the engine turns the generator. The motor delivers mechanical energy that the generator transforms it into electrical energy. Both motor and generator are usually mounted on the same base and can be moved and installed as a single unit.

FIG. 1 shows a traditional power generator, where the motor moves by electricity (input) moving the generator to produce electricity (output), by a mechanically coupled shaft.

It is important to stress that the electric energy generators described, by using a mechanical coupling, where the electrical part is exposed to either the environment or to the propellant gas, are at risk of an electric spark generation, increasing the danger for installations where you may find the presence of corrosive gases, toxic and or explosives.

The present invention relates to an electric energy Micro Generator, integrated by a pneumatic motor and an electric generator coupled magnetically:

Substituting the mechanical coupling by the magnetic, which allows us to separate hermetically the propellant part from the generator ensuring that there is no possibility that the fluid used as a propellant, the high pressures associated to said fluid, the pneumatic motor nor any of its parts that integrate it, have contact and/or penetrate into the space of the electric generator;

providing an alternative on the methods of generating electric energy in a sure and ecological manner and obtaining the necessary energy for the operation of equipment of low energy consumption such as SCADA, situation lights, audible alarms, automation equipment, intercoms, paging and physical security systems, among others.

An additional object of this invention is to provide a Micro electric energy Generator integrated by a pneumatic motor and electric generator propelled magnetically and that uses as propellant the pressure associated to a fluid: air, natural gas, bitter gas, nitrogen etc. where said pressure may be as low as 5 Kg-cm2 and as high as at least 700 Kg-cm2 returning the fluid to its original process and providing a sustainable process and intrinsically safe in our electric energy Micro Generator process.

Protection against fine dust: no penetration of dust and complete protection of contacts, and protection against harmful ingress of water at 1$m$ Immersion you will not have major quantitative effects of damage to the equipment immersed in water under definite pressure conditions and time (at 1 m of submersion);

for use in hazardous locations "where fire or explosion may exist due to flammable gases or vapors, flammable liquids, combustible dust or flammable fibers or in suspension" Classified as Class I, Division 2, Group A, B, C and D, that according to U.S. National Electrical Code, specifically refers to:

gas or vapor in abnormal or dangerous places outside the normal operations of a plant: acetylene, hydrogen and other materials with similar characteristics most common flammable substances, such as butane, gasoline . . . natural gas and propane.

Another object of this invention is to provide an electric energy Micro Generator, which has as its main scope remote installations that lack electricity, but that dispose of pressure associated with fluid.

The above and other objectives of the present invention will be established with greater clarity and detail in subsequent chapter.

BRIEF DESCRIPTION OF THE DRAWINGS OF THE INVENTION

DESCRIPTION OF THE INVENTION

The present invention relates to an electric energy Micro Generator, integrated by a pneumatic motor and an electric generator coupled magnetically, which uses as propellant the pressure associated to a fluid: designed to be intrinsically safe; with an index of protection against intrusion of solid objects or dust, accidental contacts, or water IP 67, according to the International Electro technical Commission; for use in hazardous locations "where fire or explosion may exist due to flammable gases or vapors, flammable liquids, combustible dusts or flammable fibers or in suspension" Classified as Class I, Division 1, Group A, B, C and D, according to U.S. National Electrical Code, and whose main scope is of remote installations that lack electricity, but having pressure associated with a fluid.

The present invention provides an electric energy Micro Generator, with magnetic coupling between the pneumatic motor and the electric generator, where the pneumatic motor is propelled by the associated pressure to a fluid: air, natural gas, bitter gas, nitrogen, etc., where said pressure can be as low as 5 Kg/cm2 and as high as up to at least 700 Kg/cm2; designed to be intrinsically safe; with an index of protection against intrusion of solid objects or dust, accidental contacts, or water IP 67 for use in hazardous locations classified as class I, Division 1, Group A, B, C and D, ie, the Micro Generator of the present invention uses the associated pressure as a means to a fluid propellant, where the pneumatic motor moves the electric generator by a magnetic coupling, replacing a mechanically coupled shaft.

The implementation of this coupling ensures that there is no possibility that the fluid used as propelling means, the high pressures associated to the fluid, the pneumatic motor and none of the pieces that comprise it, have contact and/or penetrate into the electric generator space. In this respect, it is important to mention that the fluid is returned to its original process, leading to a sustainable process and intrinsically safe in our process of Micro Generation.

Figure 1:
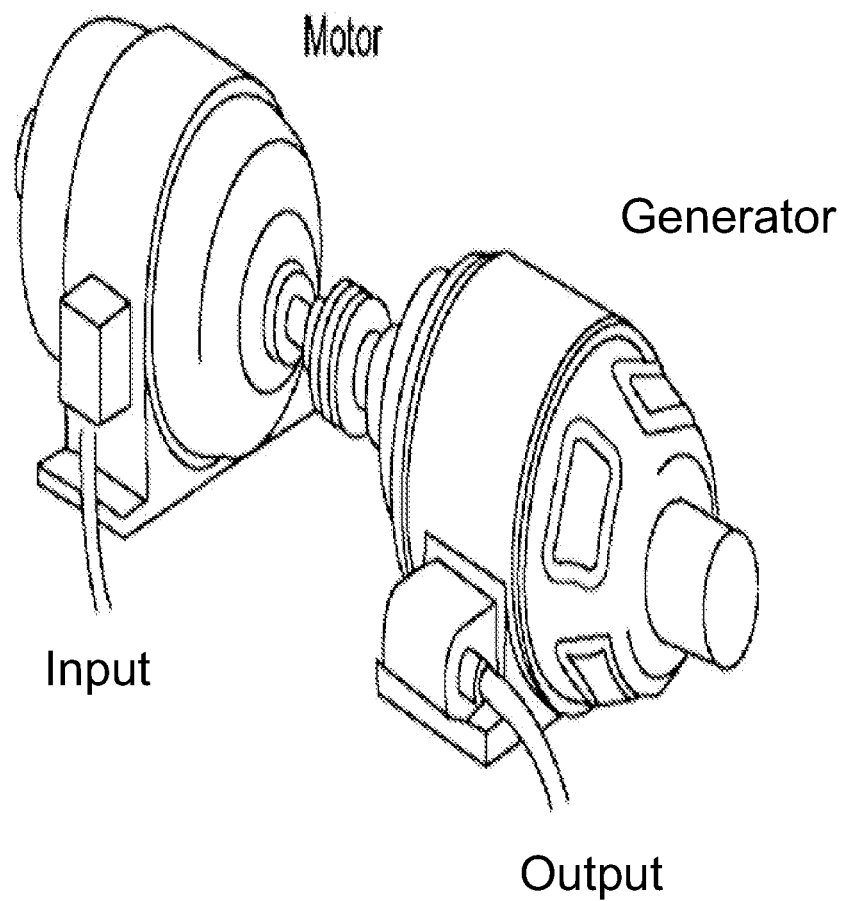
FIG. 1 shows a traditional electric energy Generator.
Figure 2:
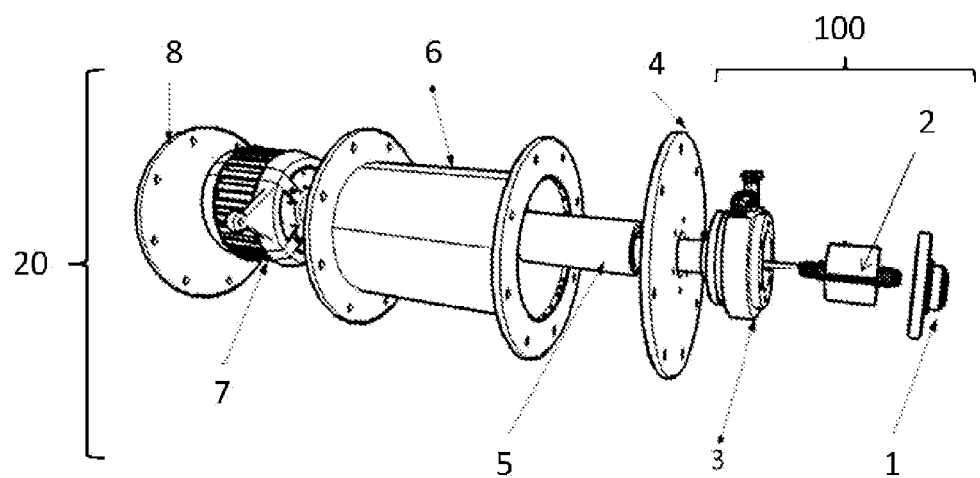
FIG. 2 shows an overview of the integration of parts of the electric energy Micro Generator of the present invention.

The electric energy Micro Generator (20) of the present invention, according to FIG. 2, is formed on the exterior by a combination of two separate isolated elements, the pneumatic motor (100) and the electric generator.

FIG. 2 shows an overview of the integration of the parts of the electric energy Micro Generator (20) of the present invention, which shows that:

The pneumatic motor (100) is in a compartment (3) which houses the pneumatic system (2) integrated by the rotor (2*a*), the blades (2*b*), the internal magnetic shaft (2*c*), the internal magnets (2*d*) and the engine compartment lid (1) of the pneumatic motor (100).

The electric generator (7) includes the electric generator as such (7) and the external magnetic coupling (5), which are housed inside the compartment (6), and front covers (4) and rear (8) to complement the isolation of the power system with the environment.

Figure 3:
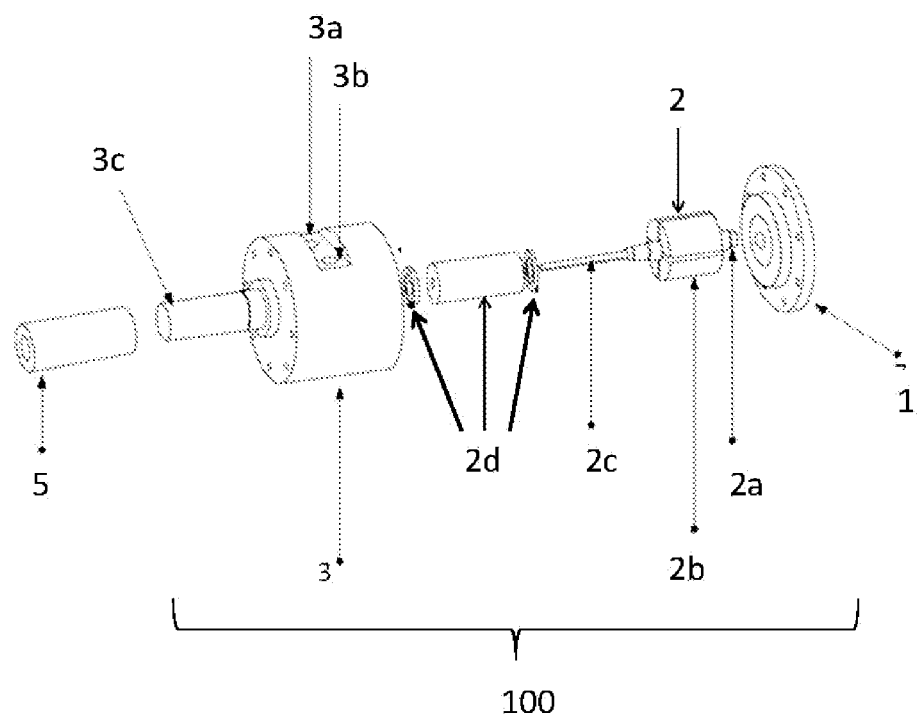
FIG. 3 shows a view of the assembly of parts that make up the pneumatic motor.

FIG. 3 shows a view of the assembly of parts that make up the pneumatic motor (100), which shows that to turn the pneumatic motor (100) is necessary to introduce a fluid pressure associated with the input jack (3*a*) located on top of the engine compartment of the pneumatic motor (100), which comprises an outlet (3*b*); likewise, you can see the rotor (2*a*), the blades (2*b*), the shaft (2*c*), the internal magnets and bearings (2*d*), the chamber (3*c*) that houses the internal magnets and bearings and the pneumatic engine cover (1).

Figure 4:
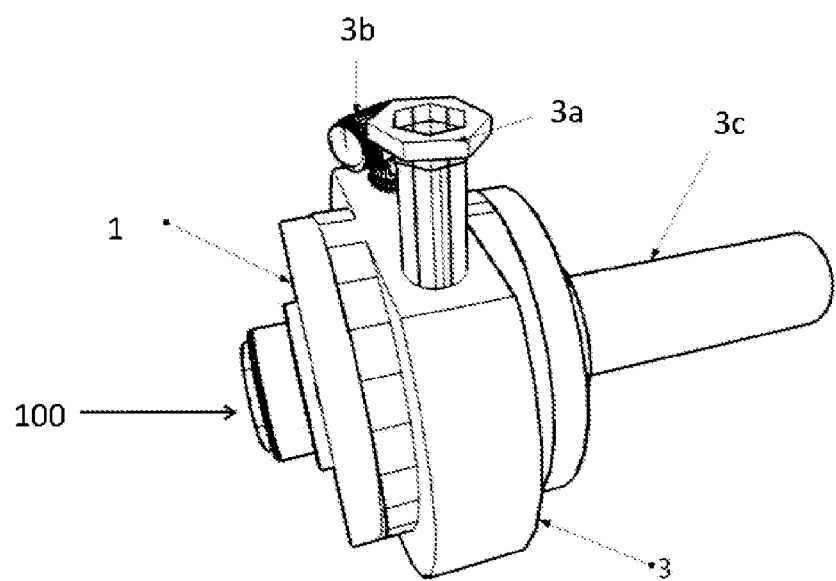
FIG. 4 shows the complete pneumatic motor assembly.

FIG. 4 shows the pneumatic motor assembly (100).

Figure 5:
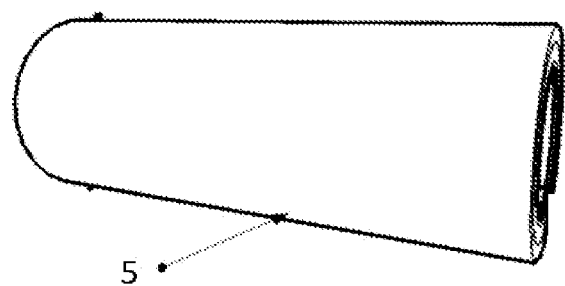
FIG. 5 shows an enlarged form the magnetic coupling of the electric generator
Figure 6:
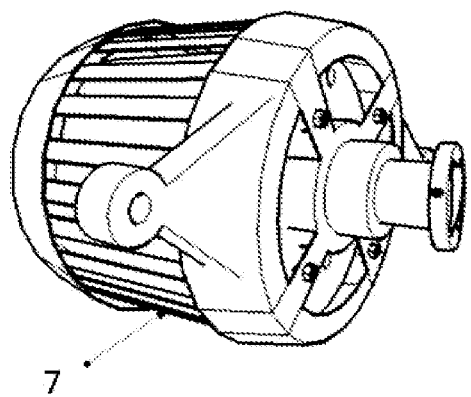
FIG. 6 shows in expanded form the electrical generator.

FIGS. 5 and 6 show in enlarged form the magnetic coupling (5) of the electric generator (external magnetic coupling) and the electric generator (7), respectively.

Figure 7:
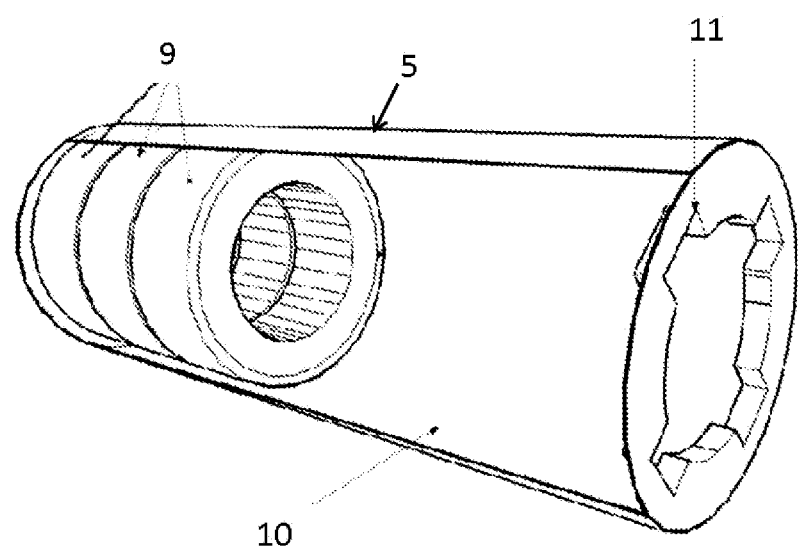
FIG. 7 shows a cross section of the magnetic coupling of the electric generator.

FIG. 7 shows a cross section of the external magnetic coupling (5) where you can appreciate the magnetic bushings (BM) (9), the tube separate (TS) (10) and the female coupling (CH) (11) of the electric generator (7).

Figure 8:
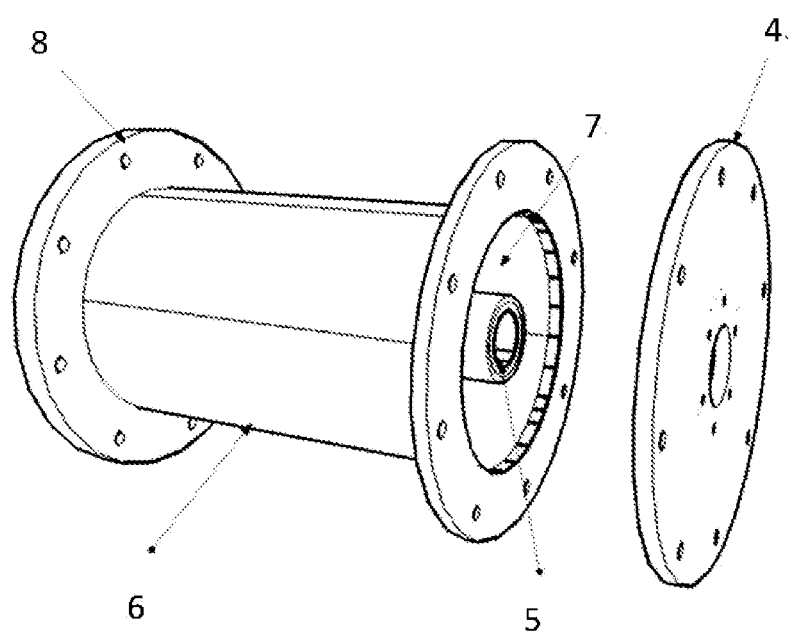
FIG. 8 shows the electric generator assembly almost complete for a better perspective of same.
Figure 9:
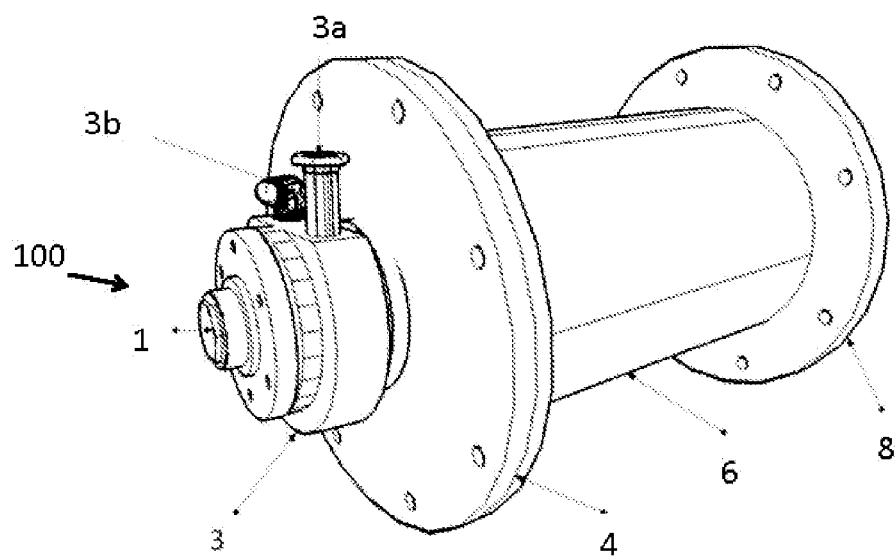
FIG. 9 shows the electric energy Micro Generator of the present invention properly assembled.

FIG. 8 shows the electric generator assembly (7) almost completely, for a better perspective of same. Said Figure shows that we only need to assemble the front cover (4) of the electric generator (7) and the pneumatic motor (100).

The Micro electrical generator of the present invention works as follows:

The pneumatic motor (100) (FIG. 3) comprises a pneumatic system (2) located inside the compartment (3), which when filled with pressure associated to a fluid at the entrance (3rd) functions as a chamber that completely isolates it from the Electric system and only permits to be coupled magnetically to the electric generator (7, via the chamber (3c) and the coupling (5), said system consists in making the pneumatic motor (100) to function with any fluid (3a) such as: air, natural gas, bitter gas, nitrogen, CO2, etc., causing the rotor (2a) and the blades (2b) to rotate eccentrically moving the shaft (2c), which in turn is coupled with the internal magnets, (high-capacity magnets, 2d), housed within the chamber (3c), around this chamber (3c) is the magnetic coupling (5) of the electric generator (7), a series of magnets (9) of high capacity (FIG. 7) in ring shape that in turn form a magnetic field around this chamber (3c), transferring and magnetically coupling the magnetic shaft (2c) and internal magnets (2d) housed in the chamber (3c) of the pneumatic motor, which forces the magnetic shaft (2c) to move inside the chamber (3c) of the pneumatic motor (100) and moves the inner and outer magnetic coupled to the electrical generator (7) to move at the same speed.

In general, the electric generator (7) moves through the magnetic coupling between the magnets (2d) attached to the shaft of the pneumatic motor (100) and housed in the chamber (3c) and the external magnetic coupling (5) which is attached to the electric generator (7), in such manner that when the shaft (2c) rotates driven by the pneumatic motor (100) also rotates the magnetic coupling; thus the electric generator (7) operates in a pressurized chamber with an inert gas, preferably nitrogen, to obtain a degree of protection against intrusion of objects solid or dust, accidental contacts, or water IP 67, and to be used in hazardous locations classified as class I, Division 2, Group A, B, C and D.

The Micro electrical generator of the present invention works with a magnetic shaft that is in a completely enclosed chamber that supports pressures as low as Kg/cm2 and as high as up to at least 700 Kg/cm2 and rotates through bearings, preferably ceramic, to prevent corrosion caused by certain gases.

According to the for mentioned, the Micro Electric Generator of the present invention provides the following features in its operation:

1. It works by jet driven and not by combustion;
2. Uses as propellant the pressure associated with a fluid: air, natural gas, bitter gas, nitrogen, etc., where such pressure can be as low as 5 Kg/cm2 and as high as up to at least 700 kg/cm2;
3. The part that is driven by the fluid moves the generator using a magnetic coupling rather than doing it with a mechanically coupled shaft;
4. Uses as means of impellent any fluid no matter how corrosive this may be; poisonous, wet or if it contains particles or liquid waste, provided they do not exceed 0.001% of the volume of the chamber of propulsion, such as air, natural gas, bitter gas, nitrogen, CO2, etc., without burning, so you do not consume the fluid used, only used for propulsion and is returned to the original process;
5. It is intrinsically safe;
6. Presents an index of protection against intrusion of solid objects or dust, accidental contacts, and water IP 67, which according to the International Electro technical Commission specifically refers to:
   a. protection against fine dust: no penetration of dust and complete protection of contacts, and
   b. protection against harmful ingress of water to 1 m Immersion you will not have major quantitative effects of damage to the equipment immersion in water under defined conditions of pressure and time (at 1 m of submersion);
7. Operates in dangerous places "where fire or explosion may exist due to flammable gases or vapors, flammable liquids, combustible dust or flammable fibers or in suspension" Classified as Class I, Division 2, Group A, B, C and D, which according the U.S. National Electrical Code specifically refers to:
   a. gas or vpor under abnormal conditions or dangerous p aces outside the normal operations of a plant:
      acetylene, hydrogen and other materials with similar characteristics, the most common flammable substances such as butane, gasoline natural gas and propane;
8. Its main application is in the field of remote installations that lack electricity but have pressure associated to a fluid;
9. Supports rupture pressures up to at least 1,000 Kg/cm2;
10. Supports operating temperatures in the pressure chamber and propulsion up to at least 300° C.; and
11. Produces at least 500 watts of power at 24 volts DC.

It is noteworthy to mention that the market does not have equipment that meets all identified operational characteristics and solve the problem of electric energy generation with the same security, ecology and without fluid consumption that impels it as does the Micro electric generator of the present invention, besides being a more efficient system that requires much less space to operate.

The following refers to some practical tests that were subjected to the electric Micro Power Generator of this invention, used as a support for a better understanding of it, without limiting its scope.

Tests

The electrical energy Micro Generator of the present invention was submitted to various operational tests, which were requested by the company RB TEC MEXICO, SA de C.V., and supervised by Bureau Veritas Mexicana S A de C V a Certificating Company witnessing the Test Protocol "OSAT" made on Jan. 15, 2010, and that for purposes of the present invention is presented as documents attesting to prior disclosure.

In this regard it is significant that in the Protocol Tests the equipment of the present invention was identified as "MICRO-GENERATOR Of ELECTRIC ENERGY WITH MAGNETIC COUPLING TECHNOLOGY PROPELLED BY GAS under the brand of "AMC GENERATION"

That document states:

That the electric Micro Generator of direct electric current was designed for remote locations where there is a stream of bitter gas, sweet gas, nitrogen or any other type of gas and the need to have power to feed electrical or electronic equipment. (Ex, Security System, SCADA control systems equipment, measurement and/or automation etc.).

Important conditions to be met by Micro Electric Generator on the premises where there s a gas flow that may be used as a propellant and the need to feed electrical or electronic equipment:
1. Be assured that when using the Micro Generator do not alter the values of pressure in the productive process, as in the load line as well as in the discharge line.
2. That the chamber where you allocate the rotation system supports at least 60 Kg/cm2 of pressure.
3. Generate at least 20 amps of current with 24 volts Direct Current.
4. That the Micro Generator that is capable of producing a usable voltage output ranging between 22 and 26 Volts Direct Current.

This was carried out by a Micro System Installation in the Package of combustible gas regulation in North Cardenas Battery, part of the Integral Active Bellota-Jujo, the Southern Branch of Pemex Exploration and Production, for conducting operational testing, interconnecting to a physical security system through a closed TV circuit PLC's, temperature sensor and Workstation Monitoring which demand charge of Energy and Instant Consumption.

Through these team crews the viability of Micro System Generation was assessed and the reliability with which the above points were met.

What is claimed is:

1. A Micro Generator of electric energy, comprising:
a pneumatic motor;
an electric generator magnetically coupled to the pneumatic motor by an external magnetic coupling; and
a first compartment for housing the electric generator and the external magnetic coupling, the first compartment having front and rear covers for electrically isolating the electric generator therein,
wherein the pneumatic motor comprises:
   a second compartment including a chamber coupled to the external magnetic coupling;
   a pneumatic system housed in the second compartment, the pneumatic system comprising: a rotor rotatably coupled to a plurality of blades, an internal magnetic shaft coupled to the plurality of blades, and a plurality of internal magnets and bearings coupled to the internal magnetic shaft and housed in the chamber, and
   an engine compartment cover for sealing an end of the second compartment,
wherein the pneumatic motor is operated using, as a propellant, a pressure associated with a fluid, the pressure causing the rotor and the blades to rotate, thereby eccentrically moving the internal magnetic shaft, which causes the internal magnets and bearings within the chamber to be magnetically coupled to the external magnetic coupling of the electric generator, and in response, the electrical generator moves at the same speed as the internal magnetic shaft.

2. The electric energy Micro Generator of claim 1, wherein the bearings of the pneumatic motor are ceramic.

3. The electric energy Micro Generator claim 1, wherein the pressure associated with the propellant fluid is greater than or equal to 5 Kg/cm2 and less than or equal to 700 kg/cm2.

4. The electric energy Micro Generator of claim 1, wherein when the pneumatic motor is filled with a fluid under pressure, the second compartment functions as a chamber that electrically isolates the pneumatic motor from the electrical generator and allows the pneumatic motor to be magnetically coupled to the electrical generator, thereby ensuring that the fluid used as propelling means, the high pressures associated to said fluid, and the pneumatic motor and do not contact and/or penetrate into the first compartment housing the electric generator.

5. The electric energy Micro Generator of claim 1, wherein a type of the propellant fluid: includes at least one of corrosive, poisonous, and wet fluids the fluid containing liquid or particles not exceeding 0.001% of the volume of the propulsion chamber.

6. The electric energy Micro Generator of claim 1, wherein the propellant fluid is at least one of air, natural gas, bitter gas, nitrogen, and CO2.

7. The electric energy Micro Generator claim 1, wherein the propellant fluid is not consumed, but returns to its original process for reuse.

8. The electric energy Micro Generator claim 1, wherein the electric generator is pressurized with an inert gas within the second compartment to obtain degree of protection against intrusion of solid objects or dust, accidental contacts, or water that is compliant with IP 67 standard published by the International Electrotechnical Commission (IEC).

9. The electric energy Micro Generator claim 1 wherein the inert gas is nitrogen.

* * * * *